United States Patent
Auduberteau et al.

(10) Patent No.: US 11,746,657 B2
(45) Date of Patent: Sep. 5, 2023

(54) TURBOMACHINE ROTOR

(71) Applicant: SAFRAN HELICOPTER ENGINES, Bordes (FR)

(72) Inventors: Alexandre Auduberteau, Moissy-Cramayel (FR); Julien Fabrice Girardot, Moissy-Cramayel (FR); Pierre Chabanne, Moissy-Cramayel (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 177 days.

(21) Appl. No.: 17/311,609

(22) PCT Filed: Dec. 3, 2019

(86) PCT No.: PCT/FR2019/000197
§ 371 (c)(1),
(2) Date: Jun. 7, 2021

(87) PCT Pub. No.: WO2020/115373
PCT Pub. Date: Jun. 11, 2020

(65) Prior Publication Data
US 2022/0034228 A1    Feb. 3, 2022

(30) Foreign Application Priority Data
Dec. 7, 2018  (FR) ..................... 1872559

(51) Int. Cl.
*F01D 5/02*    (2006.01)
*F01D 5/10*    (2006.01)

(52) U.S. Cl.
CPC ............... *F01D 5/023* (2013.01); *F01D 5/10* (2013.01); *F05D 2240/55* (2013.01); *F05D 2240/61* (2013.01); *F05D 2260/96* (2013.01)

(58) Field of Classification Search
CPC . F01D 5/023; F01D 5/10; F01D 5/026; F01D 5/26; F01D 25/04; B64C 27/001; F16D 1/076; F16D 1/09; F16D 15/1492
See application file for complete search history.

(56) References Cited

U.S. PATENT DOCUMENTS 4,973,221 A    11/1990    Anderson et al.
5,931,051 A     8/1999    Ott
(Continued)

FOREIGN PATENT DOCUMENTS

DE    10 2014 001061 A1    7/2015
FR    2 633 023 A1    12/1989
(Continued)

OTHER PUBLICATIONS

International Patent Application No. PCT/FR2019/000197, International Search Report and Written Opinion dated Mar. 9, 2020, 15 pgs.
(Continued)

*Primary Examiner* — Woody A Lee, Jr.
*Assistant Examiner* — Cameron A Corday
(74) *Attorney, Agent, or Firm* — Cozen O'Connor

(57)    ABSTRACT

The invention concerns a turbomachine rotor (1), characterised in that it comprises a threaded or tapped part (3, 6) and a damping nut (8) screwed onto the threaded or tapped part (3, 6) so as to allow the threads of the nut (8) and of the threaded or tapped part (3, 6) to rub against each other in the event of vibration of the rotor (1).

17 Claims, 2 Drawing Sheets

(56) References Cited

U.S. PATENT DOCUMENTS

| | | | |
|---|---|---|---|
| 6,024,615 A | 2/2000 | Eichinger | |
| 7,510,380 B2 | 3/2009 | Alam et al. | |
| 8,794,922 B2 * | 8/2014 | Bart | F02C 7/36 |
| | | | 416/170 R |
| 10,393,027 B2 * | 8/2019 | Lefebvre | F01D 25/18 |
| 2012/0020774 A1 | 1/2012 | Bart et al. | |
| 2014/0050564 A1 | 2/2014 | Hagan et al. | |

FOREIGN PATENT DOCUMENTS

| | | | |
|---|---|---|---|
| FR | 2 979 681 | 3/2013 | |
| FR | 3 033 890 A1 | 9/2016 | |
| WO | WO-2015084467 A2 * | 6/2015 | B23P 19/067 |

OTHER PUBLICATIONS

French Patent Application No. 1872559, Search Report dated Aug. 26, 2019; 9 pgs.

* cited by examiner

[Fig. 1]
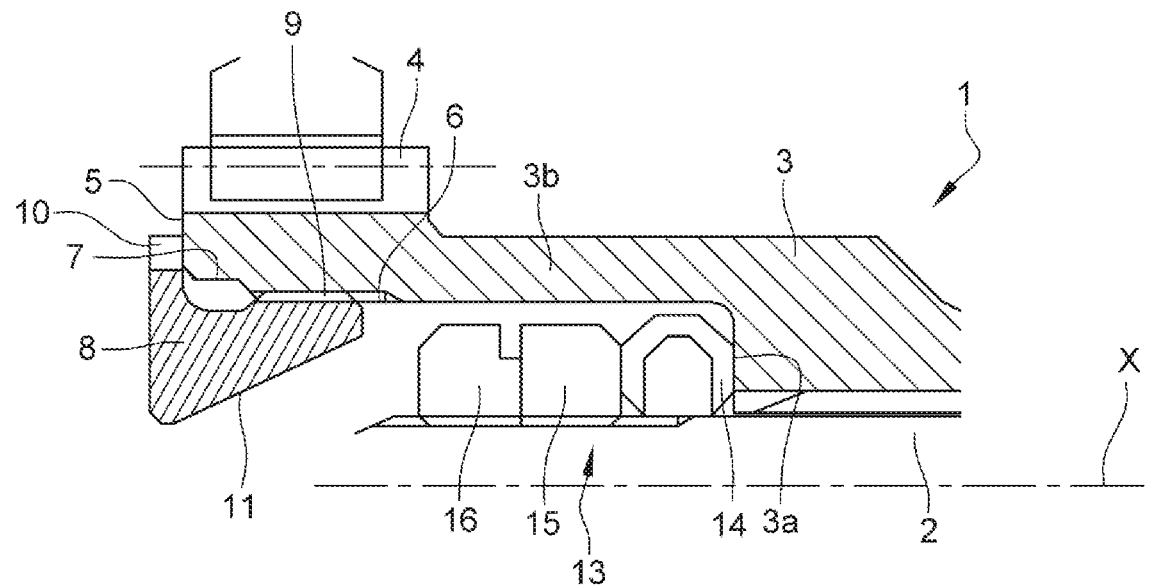
[Fig. 2]
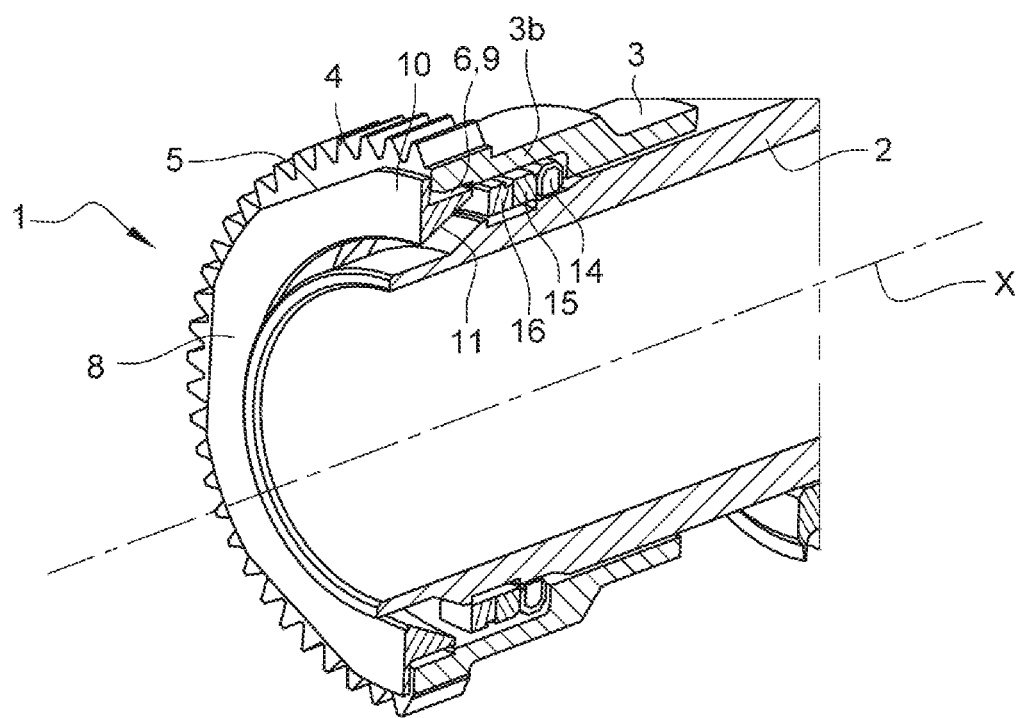

[Fig. 3]
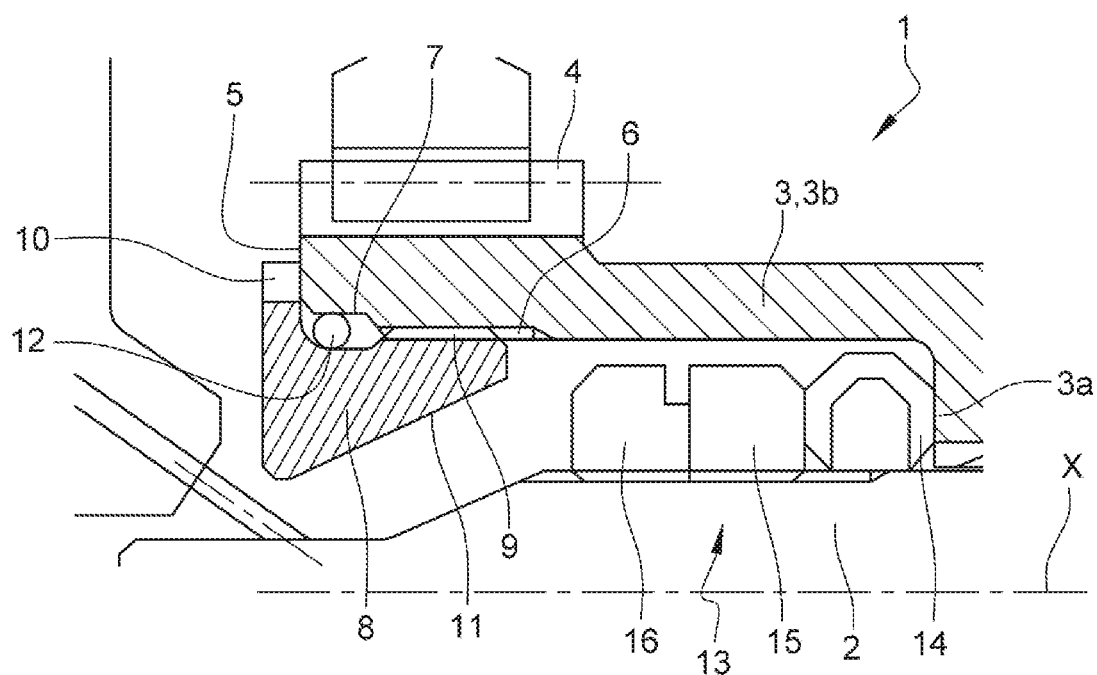

TURBOMACHINE ROTOR

CROSS-REFERENCE TO RELATED APPLICATIONS

This application is a 35 U.S.C. § 371 filing of International Application No. PCT/FR2019/000197 filed Dec. 3, 2019, which claims the benefit of priority to French Patent Application No. 1872559 filed Dec. 7, 2018, each of which is incorporated herein by reference in its entirety.

TECHNICAL FIELD OF THE INVENTION

The present invention relates to a turbomachine rotor as well as to a method for managing vibrations within a turbomachine rotor.

DISCLOSURE OF THE INVENTION

The components of a turbomachine rotor are subjected to dynamic forces of vibratory origin during the operation of the turbomachine.

The control of vibration levels is a major issue for aeronautical engine manufacturers and its importance is tending to increase due to the evolution of mechanical technologies and to the increase in aerodynamic performance leading to significant reductions in mass and increases in stress on components.

Although designers try to avoid coincidence or resonance in the operating ranges of the motor as much as possible, vibration phenomena are often unavoidable. Lastly, even though these structures do have a certain level of intrinsic or external damping, this is generally difficult to quantify and is often not sufficient to guarantee reliable operation, particularly in the case of single-piece structures.

The most common strategy for controlling vibration levels in a structure is to provide damping.

In the case of sectional components, such as impellers for example, many solutions exist and the displacements between the different sectors dissipate the energy by friction.

In the case of single-piece components, there are fewer damping solutions because they have no junctions nor interfaces at which vibration energy can be dissipated by friction.

A first solution typically used is the addition of an annular split metal ring in a groove of the single-piece component subjected to vibrations, so as to achieve damping by friction. The vibratory movements of the component generate friction in the interface area with the ring, which dissipates the energy. The disadvantage of such a solution is that it reduces the mechanical strength of the component by machining a groove, and moreover, the ring can wear out prematurely due to friction.

A second known solution is the use of visco-elastic, elastomeric or silicone-based damping coatings. In this case, the damping is provided by the coating itself. In particular, such a solution is known from document FR 2 979 681, filed by the Applicant.

However, such a solution cannot be used when operating temperatures are high. Moreover, such a solution is difficult to use when the component is subjected to a strong centrifugal field, which can lead to the detachment of the visco-elastic coating.

SUMMARY OF THE INVENTION

The invention aims to remedy the above-mentioned drawbacks in a simple, inexpensive and reliable manner.

To this end, the invention concerns a turbomachine rotor, in particular for an aircraft, characterised in that it comprises a threaded or tapped part and a damping nut screwed onto the threaded or tapped part, so as to allow the threads of the nut and of the threaded or tapped part to rub against each other in the event of vibration of the rotor.

The friction generated at the engaged threads dissipates energy and dampens rotor vibrations.

The invention can be applied to any rotating part or rotor, in particular when said rotor is a single piece.

The nut does not serve to hold a component, as is typically the case with a screwed assembly.

The damping nut is preferably located in an area of the rotor which has vibration movements to be damped. This area can be defined by numerical analysis, for example by finite element analysis, or by laboratory tests.

Note that the addition of the damping nut leads to a modification of the natural frequencies of the assembly. A frequency-positioning check can be performed to ensure that the change in natural frequency remains acceptable.

Such a damping solution can be used even in environments with high temperatures, with a limited risk of wear of the nut and the threaded or tapped part. Such a solution can be used for a rotor with high rotational speeds due to its ability to operate under centrifugal forces.

The threaded or tapped part can include an end area having teeth. Parts with teeth generate vibrations during operation. The implementation of the invention in such parts makes it possible to treat these vibratory phenomena.

The threads of the nut can be located axially opposite the external teeth, so that the friction allowing the damping of vibrations occurs near the external teeth, where the vibratory phenomena are significant.

The number of threads of the nut engaging the threaded or tapped part can be at least five.

This ensures that the friction between the threads of the nut and the threads of the threaded or tapped part is sufficiently high to dissipate the vibrations effectively. The number of threads can vary depending on the diameter of the nut and the threaded or tapped part, and on the materials used.

The nut can comprise a stop capable of bearing axially on a complementary stop of the threaded or tapped part.

Said stop allows the nut to be positioned axially relative to the threaded or tapped part and to dissipate additional energy, thereby further improving vibration damping.

The term 'axial' is defined relative to the axis of rotation of the rotor, which can be the same as the axis of the nut and/or the axis of the turbomachine.

The stop of the nut can be formed by a radially extending flange, the stop of the threaded part being formed by a radial end surface or shoulder.

An elastically deformable seal can be fitted between the nut and the threaded or tapped part of the rotor.

The deformations of the seal allow additional energy to be dissipated, thus further improving vibration damping.

Said seal can be an O-ring.

The rotor can comprise a hollow rotatable shaft and an annular coupling part mounted around the shaft and rotatably coupled thereto, the annular coupling part forming the threaded or tapped part.

Alternatively, the shaft and the coupling part can be made in one piece.

The coupling part can be screwed to the shaft, with axial-retention means holding the coupling part axially relative to the shaft.

The axial-retention means can comprise an axially deformable member. The said axially deformable member is for example a deformable seal. The axial-retention means can comprise a nut and a lock nut. The axially deformable member can be axially interposed between the nut and locknut, on the one side, and the coupling part, on the other side, so as to keep the coupling member bearing axially against an axial stop of the shaft. The deformable seal can have a U-shaped section.

The coupling part can comprise an axially extending tubular region surrounding the axial-retention means.

Such a structure is compact while allowing easy access to the axial-retention means in order to facilitate assembly and disassembly of the assembly.

The invention also relates to a method for managing vibrations within a turbomachine rotor, characterised in that it consists of screwing a damping nut onto a threaded or tapped part of the rotor in such a way as to allow the threads of the nut and of the threaded or tapped part to rub against each other in the event of vibration of the rotor.

The location of the nut can be determined by a vibration analysis of the rotor in operation.

The said nut can comprise a stop capable of bearing axially on a complementary stop of the threaded or tapped part, the stop of the nut being formed by a radially extending flange, the stop of the threaded part being formed by a radial end surface or shoulder, the threaded or tapped part comprising an end area comprising teeth.

The invention will be better understood and other details, characteristics and advantages of the invention will appear when reading the following description, which is given as a non-limiting example, with reference to the attached drawings.

BRIEF DESCRIPTION OF THE FIGURES

FIG. 1 is an axial sectional view of a part of a rotor according to one embodiment of the invention;

FIG. 2 is a perspective view, with partial cutaway, of a part of the rotor of FIG. 1;

FIG. 3 is a view corresponding to FIG. 1, illustrating another embodiment of the invention.

DETAILED DESCRIPTION OF THE INVENTION

FIGS. 1 and 2 illustrate a rotor 1 of a turbomachine according to a first embodiment of the invention. The latter comprises a hollow rotary shaft 2 of axis X. An annular coupling part 3 is mounted around the shaft 2 and rotationally coupled thereto. The part 3 has an end area comprising external teeth 4, a radial end surface 5 and a threaded part 6. The end area of the coupling part has a step 7 located axially between the radial surface 5 and the threaded part 6.

The terms 'upstream' and 'downstream' are defined relative to the gas flow through the turbomachine. The terms 'axial' and 'radial' are defined relative to the X-axis of the rotor 1, which in this case is the same as the X-axis of the turbomachine.

The rotor 1 also has a nut 8 comprising a threaded area 9, which cooperates with the threaded area 6 of the coupling part 3. The number of threads of the nut 8 engaging the threads of the threaded area 6 is at least five. The threads 9 of the nut 8 and the threaded area 6 are located axially opposite the external teeth 4.

The nut 8 further comprises a radially outwardly extending flange 10, bearing on the radial surface 5 of the end of the coupling part 3.

Additional energy is dissipated by the friction of the flange 10 on the radial surface 5, thus further improving the damping of the vibrations.

The radially inner surface 11 of the nut 8 is tapered and flares downstream.

The part 3 can be screwed onto the shaft 2. The part 3 can be held axially at the bottom of the screwing or against an axial stop of the shaft 2, by means of axial-retention means 13. These means 13 comprise a seal 14 of U-shaped cross-section and axially deformable, a nut 15 and a lock nut 16. The seal 14 is axially interposed between the nut 15 and a bearing surface 3a formed by a shoulder of the part 3. The seal 14 thus exerts a force tending to press the part 3 against the corresponding axial stop of the shaft 2.

The part 3 comprises an upstream tubular area 3b surrounding the axial-retention means 13.

During operation, when the rotor 1 is rotated, the component 3 is subject to local vibrations located mainly in parts 4, 5 and 6. These vibrations are damped by the friction generated at the engaged threads of the nut 8 and the threaded part 6, allowing energy dissipation and vibration damping of the component 3.

As illustrated in FIG. 3, an elastically deformable O-ring 12 can be accommodated between the nut 8 and the downstream end of the coupling part 3, said O-ring 12 being accommodated in part in the recess 7 of the coupling part 3. The seal 12 is located axially between the flange 10 and the threaded part 9 of the nut 8.

The deformations of the seal 12 allow additional energy to be dissipated, thereby further improving the damping of the vibrations.

In each of these embodiments, the nut 8 does not serve to hold a component, as is typically the case with a screwed assembly. The damping nut 8 is preferably located in an area of the rotor 1 which has vibration displacements to be damped. This area can be defined by numerical analysis, for example by finite element analysis, or by laboratory tests.

It should be noted that the addition of the damping nut 8 leads to a modification of the natural frequencies of the assembly. A frequency-positioning check can be performed to ensure that the change in natural frequency remains acceptable.

The invention claimed is:

1. A turbomachine rotor (1), characterised in that it comprises:
    a threaded or tapped part (3, 6); and
    a damping nut (8) screwed onto the threaded or tapped part (3, 6) so as to allow threads of the nut (8) and of the threaded or tapped part (3, 6) to rub against one another in the event of vibration of the rotor (1), the nut (8) comprising:
        a stop (10) capable of bearing axially on a complementary stop (5) of the threaded or tapped part (3) so that friction between the stop (10) and the complementary stop (5) occurs when the threaded part (3) is in rotation, the stop of the nut (8) being formed by a radially extending flange (10), the stop (5) of the threaded part (3) being formed by an end surface (5) or a radial shoulder, the threaded or tapped part (3) comprising an end area comprising external teeth (4).

2. A rotor (1) according to claim 1, characterized in that the threads (9) of the nut (8) are located axially opposite the external teeth (4).

3. A rotor (1) according to claim 2, characterized in that the number of threads of the nut (8) engaging the threaded or tapped part (3, 6) is at least five.

4. A rotor (1) according to claim 2, characterized in that an elastically deformable seal (12) is mounted between the nut (8) and the threaded or tapped part (3, 6) of the rotor (1).

5. A rotor (1) according to claim 2, characterized in that the rotor (1) comprises a hollow rotatable shaft (2) and an annular coupling part (3) mounted around the shaft (2) and rotatably coupled thereto, the annular coupling part (3) forming the threaded or tapped part.

6. A rotor (1) according to claim 1, characterized in that the number of threads of the nut (8) engaging the threaded or tapped part (3, 6) is at least five.

7. A rotor (1) according to claim 6, characterized in that an elastically deformable seal (12) is mounted between the nut (8) and the threaded or tapped part (3, 6) of the rotor (1).

8. A rotor (1) according to claim 6, characterized in that the rotor (1) comprises a hollow rotatable shaft (2) and an annular coupling part (3) mounted around the shaft (2) and rotatably coupled thereto, the annular coupling part (3) forming the threaded or tapped part.

9. A rotor (1) according to claim 1, characterized in that an elastically deformable seal (12) is mounted between the nut (8) and the threaded or tapped part (3, 6) of the rotor (1).

10. A rotor (1) according to claim 9, characterized in that said seal (12) is an O-ring.

11. A rotor (1) according to claim 10, characterized in that the rotor (1) comprises a hollow rotatable shaft (2) and an annular coupling part (3) mounted around the shaft (2) and rotatably coupled thereto, the annular coupling part (3) forming the threaded or tapped part.

12. A rotor (1) according to claim 9, characterized in that the rotor (1) comprises a hollow rotatable shaft (2) and an annular coupling part (3) mounted around the shaft (2) and rotatably coupled thereto, the annular coupling part (3) forming the threaded or tapped part.

13. A rotor (1) according to claim 1, characterized in that the rotor (1) comprises a hollow rotatable shaft (2) and an annular coupling part (3) mounted around the shaft (2) and rotatably coupled thereto, the annular coupling part (3) forming the threaded or tapped part.

14. A rotor (1) according to claim 13, characterized in that the coupling part (3) is screwed onto the shaft (2), with axial-retention means (13) holding the coupling part (3) axially relative to the shaft (2).

15. A rotor (1) according to claim 14, characterized in that the coupling part (3) comprises an axially extending tubular area (3b) surrounding the axial-retention means (13).

16. A method for managing vibrations within a turbomachine rotor (1), characterized in that it consists in screwing a damping nut (8) onto a threaded or tapped part (3, 6) of the rotor (1) in such a way as to allow threads (9, 6) of the nut (8) and of the threaded or tapped part (3) to rub against one another in the event of vibration of the rotor (1), the nut (8) comprising a stop (10) capable of bearing axially on a complementary stop (5) of the threaded or tapped part (3) so that friction between the stop (10) and the complementary stop (5) occurs when the threaded part (3) is in rotation, the stop of the nut (8) being formed by a radially extending flange (10), the stop (5) of the threaded part (3) being formed by an end surface (5) or a radial shoulder, the threaded or tapped part (3) comprising an end area comprising teeth (4).

17. A method according to claim 16, characterized in that area location of the nut (8) is determined by performing a vibration analysis of the rotor (1) during operation, and positioning the nut based on the results of the vibration analysis.

* * * * *